US012589573B2

(12) United States Patent     (10) Patent No.:    US 12,589,573 B2

Chiang et al.     (45) Date of Patent:        Mar. 31, 2026

(54) ELASTIC CLOTH AND PROTECTOR

(71) Applicant: Plus Meditech Co., Ltd., Tainan City (TW)

(72) Inventors: Yueh-Hua Chiang, Taipei City (TW); Kuo-Wei Lee, Taipei City (TW)

(73) Assignee: Plus Meditech Co., Ltd., Tainan City (TW)

( * ) Notice:     Subject to any disclaimer, the term of this patent is extended or adjusted under 35 U.S.C. 154(b) by 262 days.

(21) Appl. No.: 18/484,023

(22) Filed:     Oct. 10, 2023

(65)             Prior Publication Data

US 2024/0285009 A1      Aug. 29, 2024

(30)         Foreign Application Priority Data

Feb. 24, 2023     (TW) ................................. 112107041

(51) Int. Cl.
A41D 13/00         (2006.01)
A41D 13/05         (2006.01)
                (Continued)

(52) U.S. Cl.
CPC ................ B32B 3/30 (2013.01); A41D 13/00 (2013.01); A41D 27/28 (2013.01); A41D 31/18 (2019.02); A41D 31/185 (2019.02); B32B 3/263 (2013.01); B32B 3/266 (2013.01); B32B 5/02 (2013.01); A41D 13/05 (2013.01); B32B 3/085 (2013.01); B32B 5/26 (2013.01); B32B 2262/0207 (2013.01); B32B 2307/51 (2013.01); B32B 2535/00 (2013.01); Y10T 428/24314 (2015.01);
                (Continued)

(58) Field of Classification Search
None
See application file for complete search history.

(56)             References Cited

U.S. PATENT DOCUMENTS 1,685,825 A * 10/1928 Mullings ................ A63B 71/12
                                                           2/462
2,738,834 A *   3/1956 Jaffe ........................ A47G 9/10
                                                           5/420
                (Continued)

FOREIGN PATENT DOCUMENTS

AU             607473 B2     3/1991
DE         19647724 A1 *    5/1998    ......... A41D 13/0556
                (Continued)

OTHER PUBLICATIONS

Extended European Search Report issued in European Application No. 23211554.3, mailed on May 7, 2024 (7 pages).

*Primary Examiner* — Jeffrey A Vonch
(74) *Attorney, Agent, or Firm* — Osha Bergman Watanabe & Burton LLP

(57)             ABSTRACT

An elastic cloth includes an array of unit sheet bodies each including a main sheet body part and a connecting part. The main sheet body part has a first sheet surface surrounded by a first boundary which loops around the first sheet surface. The first boundary is formed by two interconnected first and second lateral sides. The connecting part has a first connecting surface which surrounds and adjoins the first boundary and which is sloped to indent from the first sheet surface. An average slope of the first connecting surface adjacent to a center of the first lateral side is greater than an average slope adjacent to a center of the second lateral side.

10 Claims, 8 Drawing Sheets

(51) Int. Cl.

| | |
|---|---|
| *A41D 27/28* | (2006.01) |
| *A41D 31/18* | (2019.01) |
| *B32B 3/24* | (2006.01) |
| *B32B 3/26* | (2006.01) |
| *B32B 3/30* | (2006.01) |
| *B32B 5/02* | (2006.01) |
| *B32B 3/08* | (2006.01) |
| *B32B 5/26* | (2006.01) |

(52) U.S. Cl.
CPC .. *Y10T 428/24322* (2015.01); *Y10T 428/2457* (2015.01); *Y10T 428/24612* (2015.01)

(56) References Cited

U.S. PATENT DOCUMENTS

| | | | | |
|---|---|---|---|---|
| 3,125,762 | A * | 3/1964 | Glahe | A63B 71/12 |
| | | | | 2/463 |
| 4,272,850 | A * | 6/1981 | Rule | A41D 13/065 |
| | | | | 2/24 |
| 5,160,785 | A * | 11/1992 | Davidson, Jr. | A47C 27/146 |
| | | | | 5/736 |
| 5,168,576 | A * | 12/1992 | Krent | A41D 13/0156 |
| | | | | 2/463 |
| 5,477,558 | A * | 12/1995 | Volker | A41D 13/0153 |
| | | | | 2/24 |
| 5,599,290 | A * | 2/1997 | Hayes | A41D 13/0568 |
| | | | | 602/61 |
| 6,093,468 | A * | 7/2000 | Toms | A41D 31/14 |
| | | | | 2/22 |
| 6,182,299 | B1 * | 2/2001 | Chen | A41D 13/0518 |
| | | | | 2/92 |
| 6,743,325 | B1 * | 6/2004 | Taylor | B32B 3/16 |
| | | | | 156/271 |
| 6,775,851 | B1 * | 8/2004 | Chen | A41D 13/0156 |
| | | | | 2/463 |

| | | | | |
|---|---|---|---|---|
| 2005/0081277 | A1 * | 4/2005 | Matechen | A41D 13/0518 |
| | | | | 2/102 |
| 2006/0199456 | A1 * | 9/2006 | Taylor | B32B 5/026 |
| | | | | 442/305 |
| 2010/0132099 | A1 * | 6/2010 | Green | C08L 83/08 |
| | | | | 2/24 |
| 2011/0035864 | A1 * | 2/2011 | Gordon | A41D 13/015 |
| | | | | 2/455 |
| 2011/0209275 | A1 * | 9/2011 | Berns | B32B 38/185 |
| | | | | 2/455 |
| 2013/0000024 | A1 * | 1/2013 | Perreault | A41D 13/0568 |
| | | | | 2/463 |
| 2013/0025035 | A1 * | 1/2013 | Turner | A41D 13/0593 |
| | | | | 2/455 |
| 2013/0025036 | A1 * | 1/2013 | Turner | A42B 3/125 |
| | | | | 2/455 |
| 2013/0025037 | A1 * | 1/2013 | Turner | A41D 13/0593 |
| | | | | 2/455 |
| 2015/0082523 | A1 * | 3/2015 | Wyner | B32B 7/12 |
| | | | | 2/455 |
| 2015/0101110 | A1 * | 4/2015 | Wagner | A41D 13/0156 |
| | | | | 2/455 |
| 2015/0335079 | A1 * | 11/2015 | Lacey | A41D 13/015 |
| | | | | 428/134 |
| 2017/0100660 | A1 | 4/2017 | Campbell et al. | |
| 2021/0076758 | A1 * | 3/2021 | Taylor | A41D 13/0543 |

FOREIGN PATENT DOCUMENTS

| | | | | | |
|---|---|---|---|---|---|
| DE | 202013100788 | U1 * | 3/2013 | | A41D 13/065 |
| EP | 1369149 | A1 * | 12/2003 | | A41D 13/0531 |
| FR | 2797153 | A1 * | 2/2001 | | A41D 13/08 |
| GB | 2177892 | A * | 2/1987 | | A63B 71/1225 |
| GB | 2246282 | A * | 1/1992 | | A41D 13/0581 |
| KR | 20060080674 | A * | 7/2006 | | A41D 13/1245 |
| KR | 20100043856 | A * | 4/2010 | | A41D 1/04 |
| WO | WO-2016203663 | A1 * | 12/2016 | | B32B 5/24 |

\* cited by examiner

101

102

101

102

ELASTIC CLOTH AND PROTECTOR

CROSS-REFERENCE TO RELATED APPLICATION

This application claims priority to Taiwanese Invention Patent Application No. 112107041, filed on Feb. 24, 2023.

FIELD

The disclosure relates to a cloth, and more particularly to an elastic cloth and a protector.

BACKGROUND

In recent years, the popularity of sports has led to an increase in need for protectors to help treat and rehabilitate sports injuries. Besides, modern people often maintain the same posture, which may causes symptoms such as carpal tunnel syndrome, tennis elbow, etc., and need the assistance of assistive devices.

Conventional protectors, such as wrist braces, not only suffer from poor ventilation, but also easy to get dirty due to their exposure to the outside. In addition, conventional protectors may deteriorate the appearance of the wearer. Some conventional protectors, such as knee pads, have been combined with clothes to be formed into a protective clothing such as knee protective padded legging, in order to avoid affecting the appearance of the wearer. However, in order to ensure the protection effect, the knee part of such protective clothing is formed to have a thickness greater than the rest part of the protective clothing, which may produce a foreign body feeling to the wearer.

SUMMARY

Therefore, an object of the disclosure is to provide an elastic cloth that can alleviate at least one of the drawbacks of the prior art.

According to the disclosure, the elastic cloth includes an array of unit sheet bodies which are connected to one another and which are aligned in a first direction and a second direction that intersects the first direction. Each of the unit sheet bodies includes a main sheet body part and a connecting part. The main sheet body has a first sheet surface and a first boundary which loops around the first sheet surface. The first boundary includes a first lateral side, and a second lateral side which is connected to the first lateral side to form a loop that loops around the first surface. The connecting part is connected to the main sheet body part and has a first connecting surface which adjoins the first boundary and faces in the same direction as the first sheet surface. The connecting parts of adjacent ones of the unit sheet bodies adjoining each other. The first connecting surface of the connecting part of each of the unit sheet bodies is sloped to indent from the first sheet surface such that a first groove is formed around the main sheet body part of each of the unit sheet bodies. For each of the unit sheet bodies, an average slope of the first connecting surface adjacent to a center of the first lateral side is greater an average slope of the first connecting surface adjacent to a center of the second lateral side.

Another object of the disclosure is to provide a protector that can alleviate at least one of the drawbacks of the prior art.

According to the disclosure, the protector is adapted for fitting on a human skin, and includes the above-stated elastic cloth, and a fabric material disposed on the first sheet surface of the main sheet body part of the elastic cloth. The main sheet body part of the elastic cloth further has a second sheet surface which is opposite to the first sheet surface and which is adapted for contacting the human skin.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
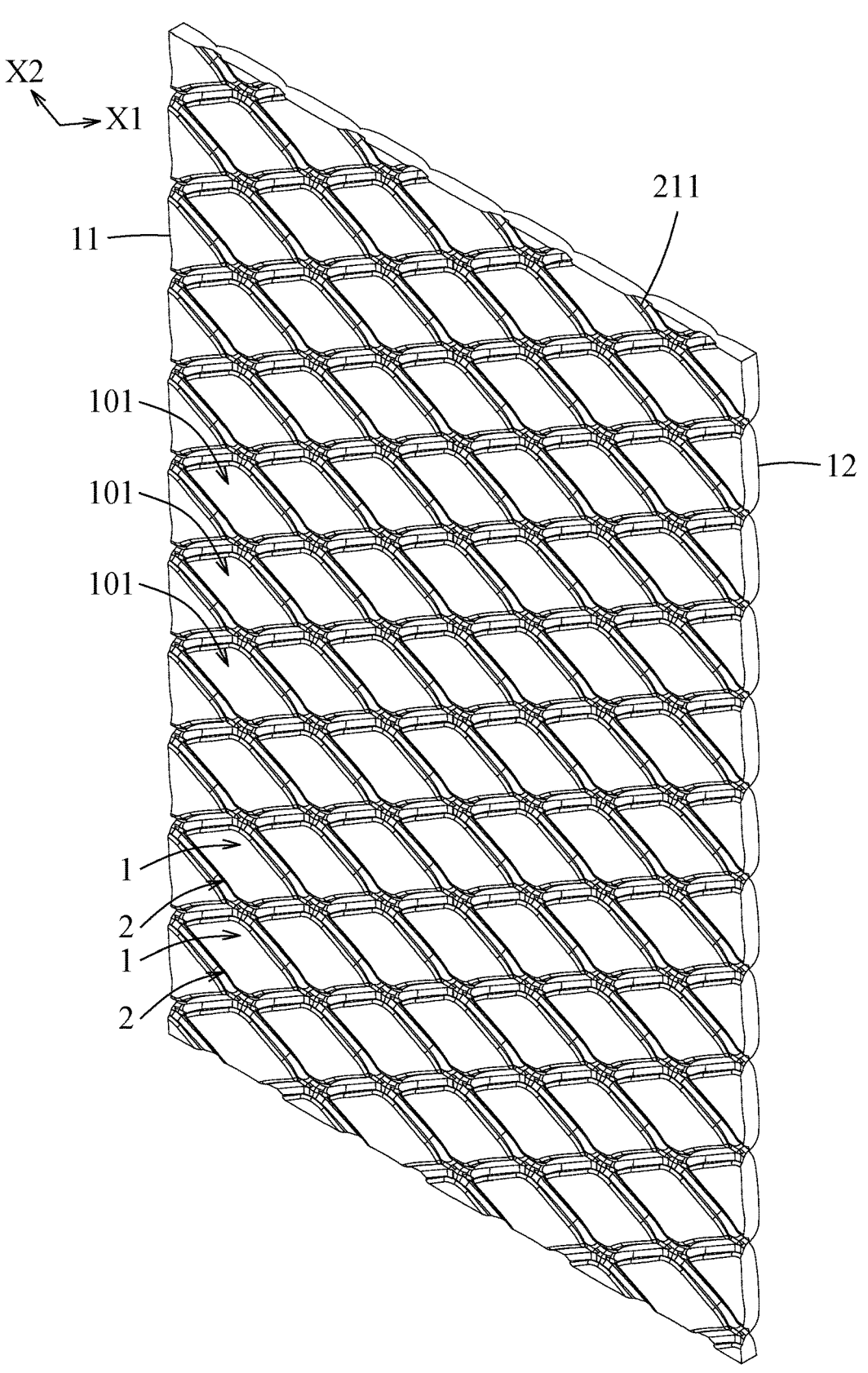
FIG. 1 is a perspective view of an embodiment of an elastic cloth according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
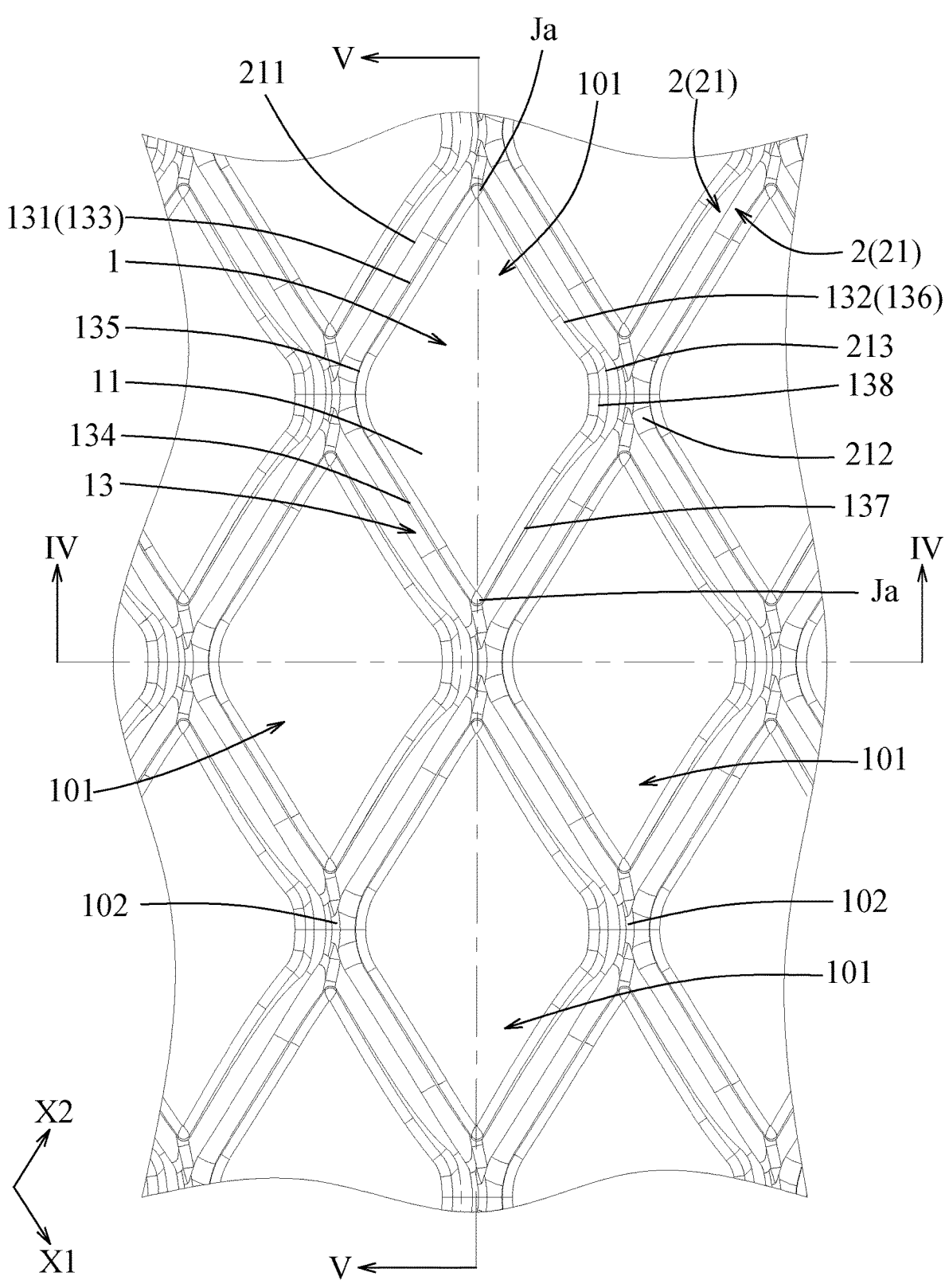
FIG. 2 is a fragmentary front view of the embodiment.

Referring to FIGS. 1 and 2, an embodiment of an elastic cloth according to the present disclosure is shown. The elastic cloth includes an array of unit sheet bodies 101 which are connected to one another and which are aligned in a first direction X1 and a second direction X2 that intersects the first direction X1, and a plurality of ventilation slits 102 each of which is formed between adjacent ones of the unit sheet bodies 101. The elastic cloth is made of, for example, but not limited to, polychloroprene rubber.

Each of the unit sheet bodies 101 includes a main sheet body part 1 and a connecting part 2.

Figure 3:
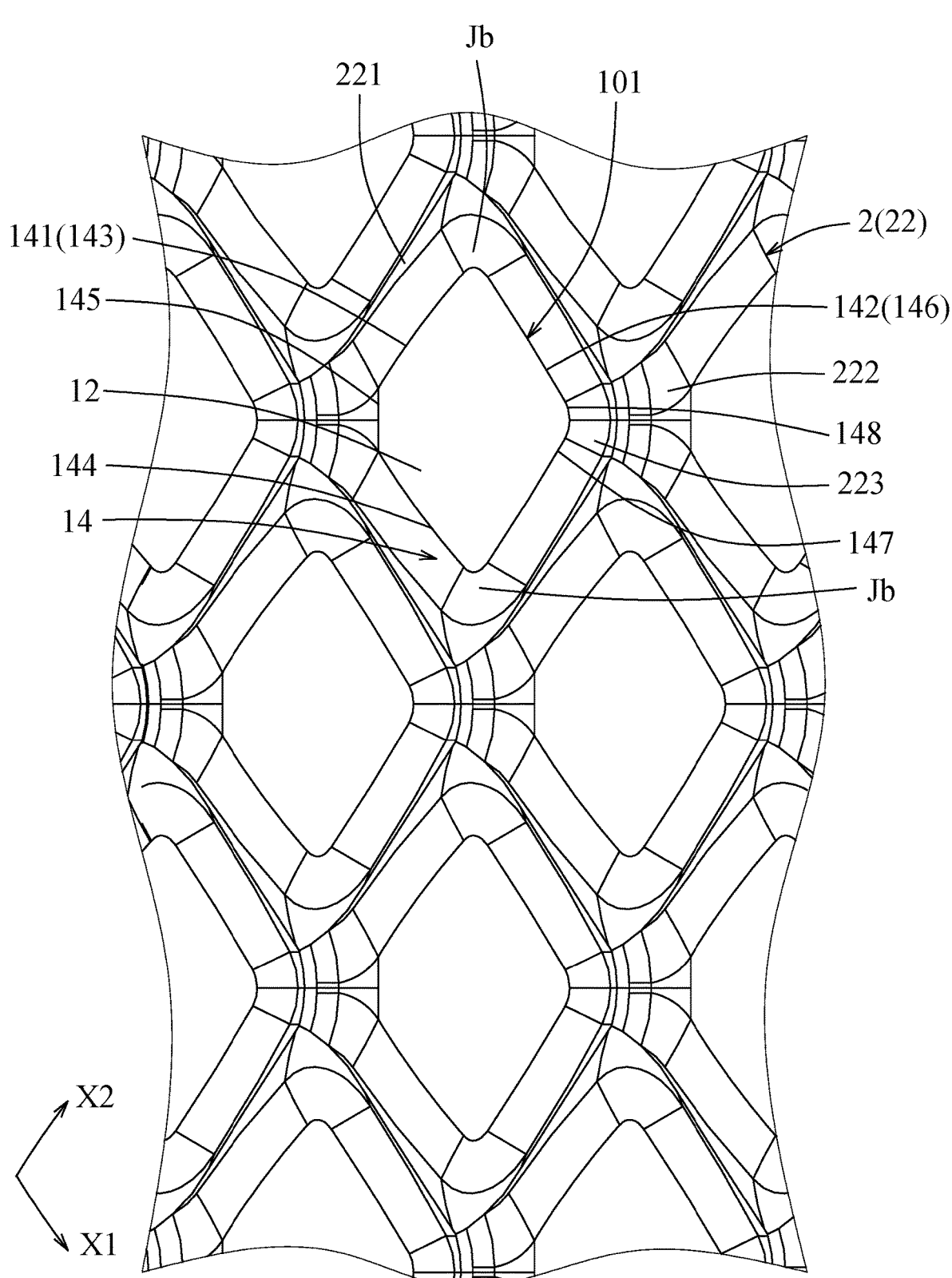
FIG. 3 is a fragmentary rear view of the embodiment.

Referring to FIG. 3 in combination with FIGS. 1 and 2, the main sheet body part 1 has a first sheet surface 11, a second sheet surface 12 which is opposite to the first second surface 11, a first boundary 13 which loops around the first sheet surface 11, and a second boundary 14 which loops around the second sheet surface 12. The first boundary 13 includes a first lateral side 131, and a second lateral side 132 which is connected to the first lateral side 131 to form a loop that loops around the first sheet surface 11. The second boundary 14 includes a third lateral side 141, and a fourth lateral side 142 which is connected to the third lateral side 141 to form a loop that loops around the second sheet surface 12.

Specifically, the first lateral side 131 has two opposite ends respectively connected to two opposite ends of the second lateral side 132 at two junctions to form a rhomboidal loop that loops around the first sheet surface 11. The third lateral side 141 has two opposite ends respectively connected to two opposite ends of the fourth lateral side 142 at two junctions to form a rhomboidal loop that loops around the second sheet surface 12. Each of the first and second boundaries 13, 14 has a rhomboidal boundary, and each of the first, second, third, and fourth lateral sides 131, 132, 141, 142 forms a half of the rhomboidal boundary.

The connecting part 2 is connected to the main sheet body part 1 and has a first connecting surface 21 which surrounds and adjoins the first boundary 13 and faces in the same direction as the first sheet surface 11. The connecting parts 2 of adjacent ones of the unit sheet bodies 101 adjoining each other. The first connecting surface 21 of the connecting part 2 of each unit sheet body 101 is sloped to indent from the first sheet surface 11 such that a first grooves 211 is formed around the main sheet body part 1 of each unit sheet body 101. For each of the unit sheet bodies 101, an average slope of the first connecting surface 21 adjacent to a center (which will be explained hereinafter) of the first lateral side 131 is greater than an average slope of the first connecting surface 21 adjacent to a center (which will be explained hereinafter) of the second lateral side 132. In addition, an average slope of the first connecting surface 21 adjacent to each of the junctions (J) is smaller than the average slope of the first connecting surface 21 adjacent to the center of the second lateral side 132.

The term "a center of the first lateral side" means a part of the first lateral side 131 that is intermediate between the two opposite ends of the first lateral side 131. The term "a center of the second lateral side" means a part of the second lateral side 132 that is intermediate between the two opposite ends of the second lateral side 132. In FIG. 2, the centers of the first and second lateral sides 131, 132 are respectively shown at 135, 138 and will be detailed hereinafter.

Since the first connecting surface 21 has various average slopes at different positions, the elastic cloth of the embodiment has a varying thickness. Accordingly, the elastic cloth of the embodiment has relatively thick parts, which is dense and hard to thereby enhance tightness, and relatively thin parts, which is less dense and soft to thereby reduce a foreign body feeling.

Specifically, the first lateral side 131 includes two first lateral side segments 133, 134 which are respectively parallel to the second direction X2 and the first directions X1, and a first corner segment 135 which is connected between the first lateral side segments 133, 134. In this embodiment, the first corner segment 135 is the center of the first lateral side 131. The second lateral side 132 includes two second lateral side segments 136, 137 which are respectively parallel to the first and direction X1 and the second direction X2, and a second corner segment 138 which is connected between the second lateral side segments 136, 137. In this embodiment, the second corner segment 138 is the center of the second lateral side 132.

Figure 4:
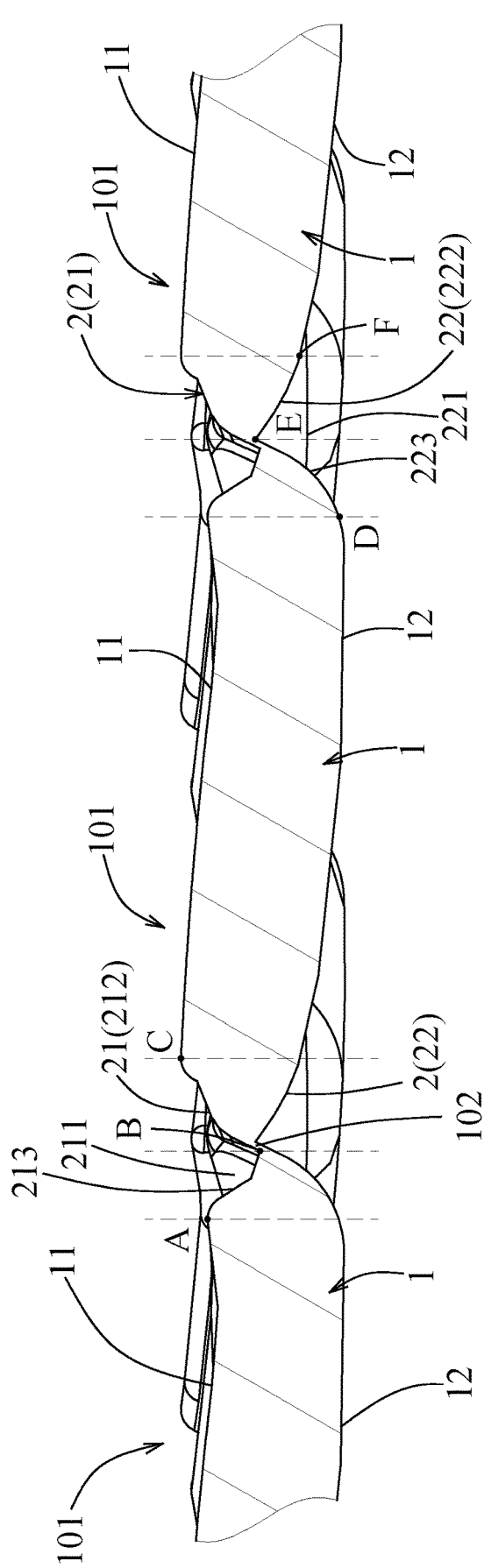
FIG. 4 is a fragmentary sectional view taken along line IV-IV in FIG. 2.

As shown in FIGS. 1, 2, and 4, each first groove 211 is rhomboidal and is formed around the main sheet body part 1 of one of the unit sheet bodies 101. The first connecting surface 21 of the connecting part 2 of each of the unit sheet bodies 101 adjoins the first connecting surfaces 21 of more than two unit sheet bodies 101, (i.e., eight unit sheet bodies

Figure 5:
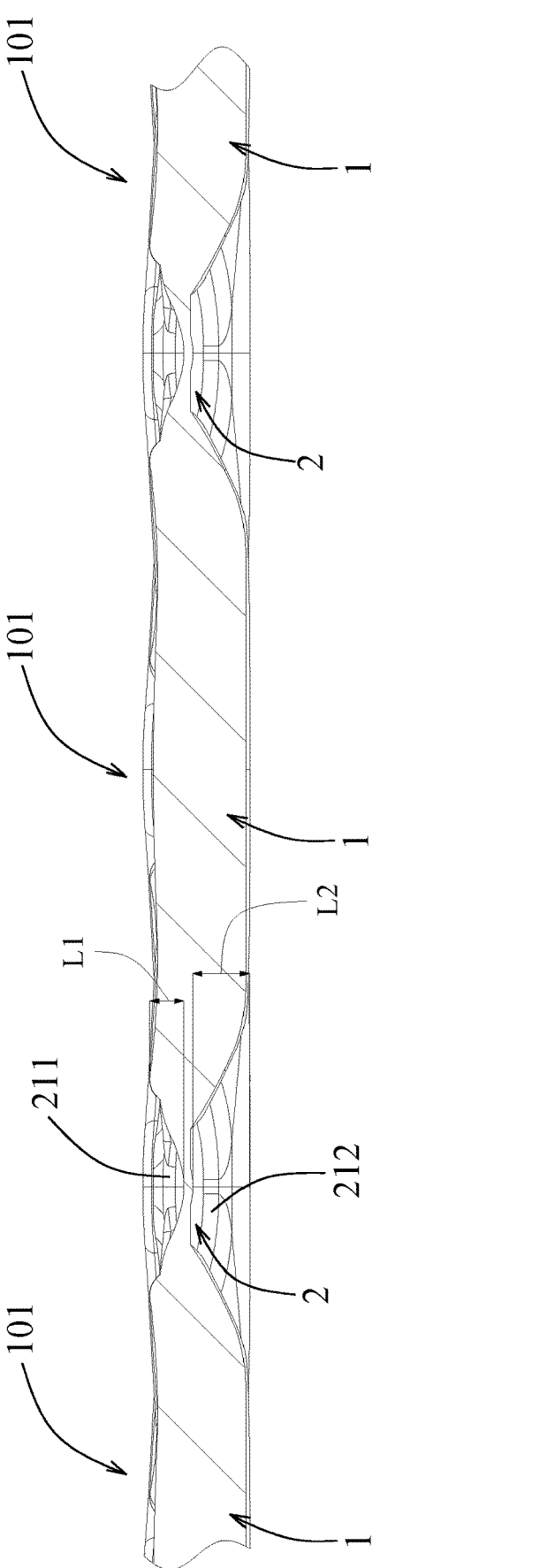
FIG. 5 is a fragmentary sectional view taken along line V-V in FIG. 2.

101 in this embodiment). Each ventilation slit 102 is formed within a part of the first groove 211 where four unit sheet bodies 101 adjoin each other. The first connecting surface 21 of the connecting part 2 of each of the unit sheet bodies 101 includes a first groove side surface part 212 which adjoins the first corner segment 135 (i.e., the center of the first lateral side 131), and a second groove side surface part 213 which adjoins the second corner segment 138 (i.e., the center of the second lateral side 131). The first groove side surface part 212 has the average slope greater than the average slope of the second groove side surface part 213. In this embodiment, each of the ventilation slits 102 is formed between the connecting parts 2 of two adjacent ones of the sheet bodies 101. To be more specific, in this embodiment, each of the ventilation slits 102 is formed between the first groove side surface part 212 of the first connecting surface 21 of one of the unit sheet bodies 101 and the second groove side surface part 213 of the first connecting surface 21 of an adjacent one of the unit sheet bodies 101 and between two other unit sheet bodies 101, each of which has a portion of the first connecting surface 21 thereof that adjoins the junction (Ja) of the corresponding unit sheet bodies 101 and that extends in between the first and second groove side surface parts 212, 213 of the two unit sheet units 101. The average slopes of the first and second groove side surface parts 212 are different from each other, and the average slopes of the portions of the other two unit sheet bodies 101 are shown in FIG. 5 and are different from that of the first and second groove side surface parts 212, 213. Thus, the elastic cloth has a varying thickness around each ventilation slit 102. Through the ventilation slits 102, hot air and moisture can be discharged. Such ventilation effect can be further enhanced with the relatively thin parts of the elastic cloth of the embodiment.

Referring to FIGS. 2 and 4, it is noted that the average slope of the second groove side surface part 213 of the first connecting surface 21 is an absolute value of slope of a line defined between the highest point of the second lateral side 132 (i.e., point A in FIG. 4) and the lowest point of the first connecting surface 21 (i.e., point B in FIG. 4); and the average slope of the first groove side surface part 212 of the first connecting surface 21 is an absolute value of slope of an imaginary line defined between the highest point of the first lateral side 131 (i.e., point C in FIG. 4) and the lowest point of the first connecting surface 21 (i.e., point B in FIG. 4). The connecting part 2 further has a second connecting surface 22 which faces in the same direction as the second sheet surface 12 and which loops around and adjoins the second boundary 14. The second connecting surface 22 of the connecting part 2 of each of the unit sheet bodies 101 is connected to the second connecting surface 22 of the connecting part 2 of adjacent ones of the unit sheet bodies 101.

The second connecting surface 22 of each unit sheet body 101 is sloped to indent from the second sheet surface 12 such that a second groove 221 is formed around the main sheet body part 1 of each of the unit sheet bodies 101. For each of the unit sheet bodies 101, an average slope of the second connecting surface 22 adjacent to a center of the third lateral side 141 is greater than an average slope of the second connecting surface 22 adjacent to a center of the fourth lateral side 142. Such configuration of the second connecting surface 22 can produce similar effects to those produced by the configuration of the first connecting surface 21 as stated above.

Figure 6:
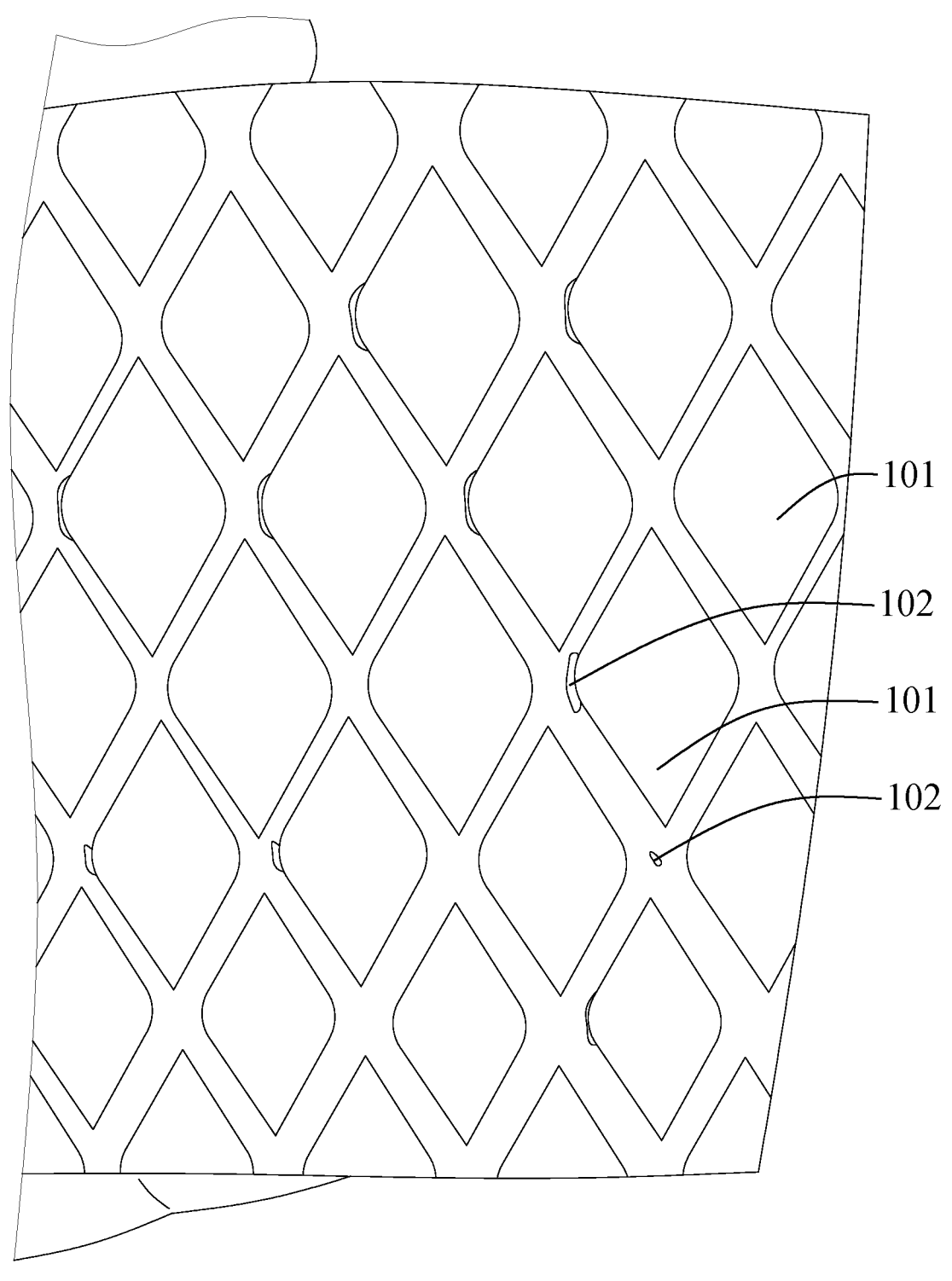
FIG. 6 is a schematic front view of the embodiment, illustrating that the elastic cloth is not stretched.

Specifically, referring to FIGS. 3, 4, and 6, the third lateral side 141 of the second boundary 14 includes two third lateral side segments 143, 144 which are respectively parallel to the second direction X2 and the first direction X1, and a third corner segment 145 which is connected between the third lateral side segments 143, 144. The fourth lateral side 142 of the second boundary 14 includes two fourth lateral side segments 146, 147 which are respectively parallel to the first direction X1 and the second direction X2, and a fourth corner segment 148 which is connected between the fourth lateral side segments 146, 147. The second connecting surface 22 of the connecting part 2 of each of the unit sheet bodies 101 includes a third groove side surface part 222 which adjoins the third corner segment 145 (i.e., the center of the third lateral side 141), and a fourth groove side surface part 223 which adjoins the fourth corner segment 148 (i.e., the center of the fourth lateral side 142). Therefore, the third groove side surface part 222 of the second connecting surface 22 has an average slope greater than an average slope of the fourth groove side surface part 223 of the second connecting surface 22. In this embodiment, each of the ventilation slits 102 is formed between the third groove side surface part 222 of the second connecting surface 22 of one of the unit sheet bodies 101 and the fourth groove side surface part 223 of the second connecting surface 22 of an adjacent one of the unit sheet bodies 101 and two other unit sheet bodies 101, each of which has a portion of the first connecting surface 21 that adjoins the respective junction (Jb) and that extends in between the third and fourth groove side surface parts 222, 223 of two adjacent unit sheet bodies 101. Thus, the elastic cloth has a varying thickness around each ventilation slit 102.

It is noted that the average slope of the fourth groove side surface part 223 of the second connecting surface 22 is an absolute value of slope of an imaginary line defined between a point of the second connecting surface 22 which is directly below the highest point of the second lateral side 132 (i.e., point D in FIG. 4 which is directly below point A) and the highest point of the second connecting surface 22 (i.e., point E in FIG. 4); and the average slope of the third groove side surface part 222 of the second connecting surface 22 is an absolute value of slope of an imaginary line defined between another point of the second connecting surface 22 which is directly below the highest point of the first lateral side 131 (i.e., point F in FIG. 4 which is directly below point C) and the highest point of the second connecting surface 22 (i.e., point E in FIG. 4).

Referring back to FIGS. 2 and 4, in this embodiment, each of the first grooves 211 has two parts each of which is formed between the first groove side surface part 212 of the first connecting surface 21 of each of the unit sheet bodies 101 and the second groove side surface part 213 of the first connecting surface 21 of an adjacent one of the unit sheet bodies 101. Referring back to FIGS. 3 and 4, each of the second grooves 221 has two portions each of which is formed between the third groove side surface part 222 of the second connecting surface 22 of each of the unit sheet bodies 101 and the fourth groove side surface part 223 of the second connecting surface 22 of an adjacent one of the unit sheet bodies 101. A depth of the first groove 211 is smaller than a depth of the second groove 221. Referring to FIG. 5, for each of the unit sheet bodies 101, the second groove 221 has a depth (indicated as "L2" in FIG. 5) greater than a depth of the first groove 211 (indicated as "L1" in FIG. 5). Specifically, in this embodiment, the first groove 211 has a depth (L1) ranging from 0.1 mm to 1 mm, and the second groove 221 has a depth (L2) ranging from 1 mm to 3 mm.

Since each of the first connecting surface 21 and the second connecting surface 22 has different average slopes, and the depths of the first grooves 211 are different from the depths of the second grooves 221, the main sheet body part 1 and the connecting part 2 of each of the unit sheet bodies 101 have various thicknesses. In this embodiment, for example, for each of the unit sheet bodies 101, the main sheet body part 1 has a thickness ranging from 1.5 mm to 5 mm, and the connecting part 2 has a thickness ranging from 0.05 mm to 0.2 mm.

In this embodiment, for each of the main sheet body parts 1, the first lateral side 131 and the second lateral side 132 of the first boundary 13 are connected such that the first boundary 13 has a rhomboidal shape. However, the shape of the first boundary 13 is not limited to this embodiment, and the first boundary 13 may have a rectangle, a triangle, a pentagonal, a hexagonal, or other polygonal shape.

Figure 7:
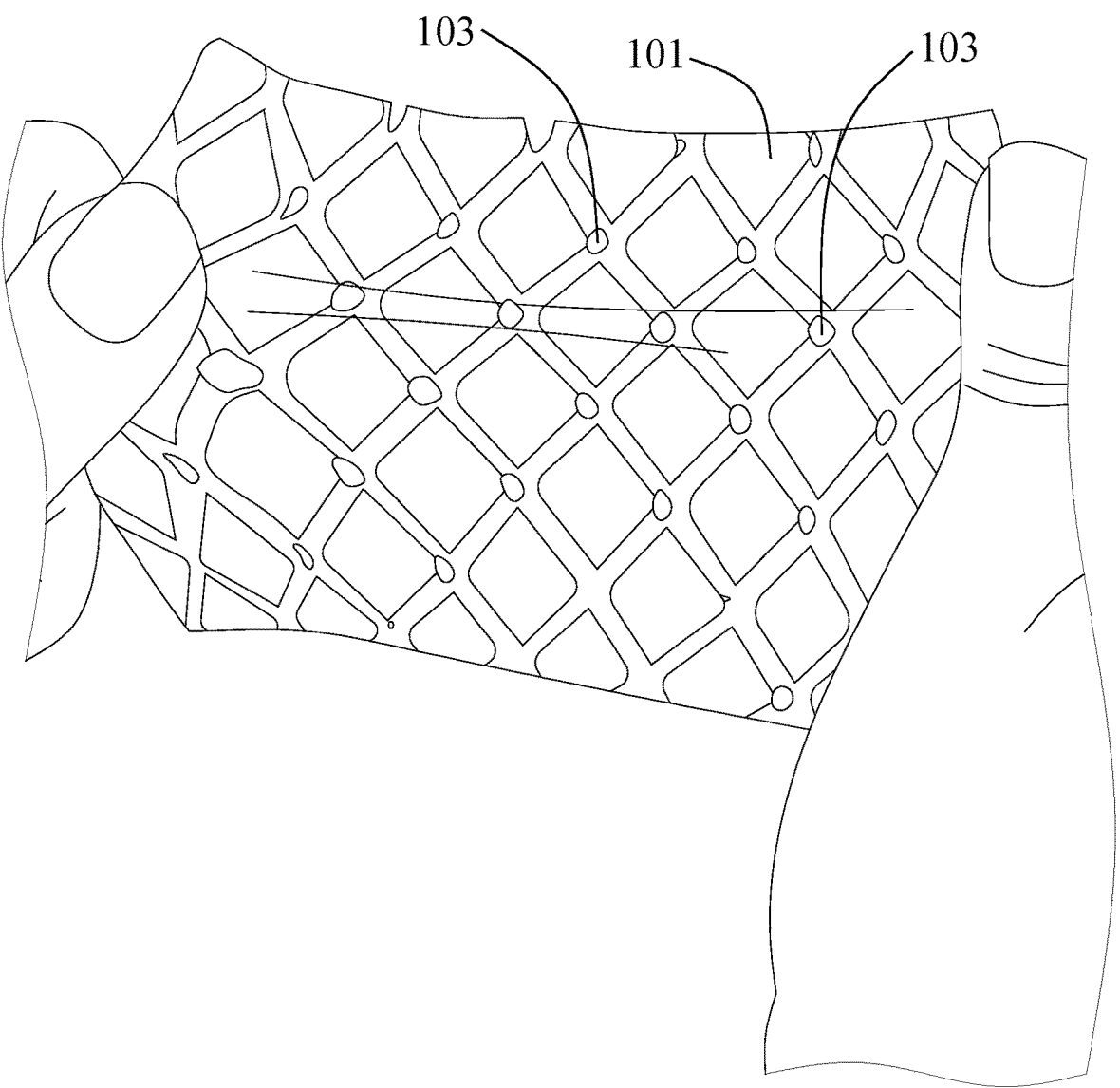
FIG. 7 is a schematic front view of the embodiment, illustrating that the elastic cloth is stretched.

Referring to FIGS. 6 and 7, each of the ventilation slits 102 is capable of being broaden to be formed into an enlarged ventilation hole 103 when the elastic cloth is stretched, thereby enhancing the ventilation effect of the elastic cloth. The ventilation hole 102 after being enlarged may be circular.

Figure 8:
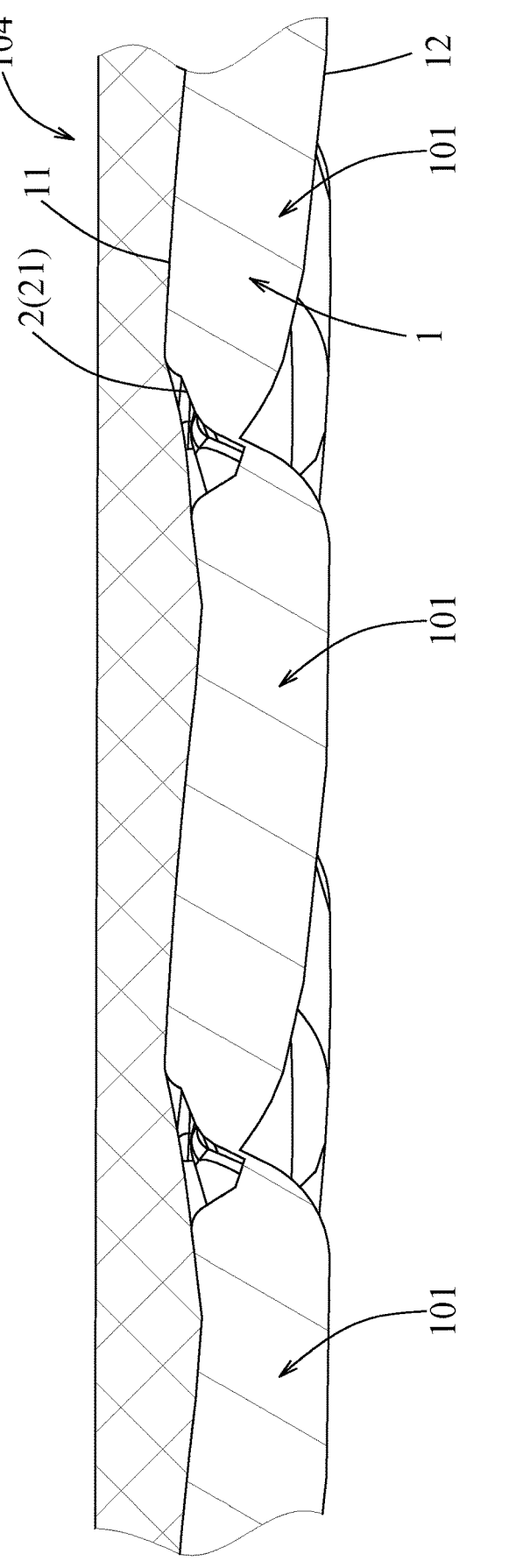
FIG. 8 is a fragmentary schematic sectional view of an embodiment of a protector according to the present disclosure.

Referring to FIG. 8, an embodiment of a protector according to the present disclosure is shown. The protector is adapted for fitting on a human skin, and includes the above-stated elastic cloth, and a fabric material 104 disposed on the first sheet surface 11 of the main sheet body part 1 of each of the unit sheet bodies 101 of the elastic cloth. The second sheet surface 12 of the main sheet body part 1, which is opposite to the first sheet surface 11, is adapted for contacting the human skin.

The fabric material 104 may be a wearable clothing, for example, a pant. Since the protector of the present disclosure includes the above-stated elastic cloth, which may contact the skin of the user when the protector is worn, the protector offers an enhanced fit while reducing a foreign body feeling. This motivates the user to wear the protector and allows the user to be more willing to wear the protector for a long time to be able to achieve long-term health care.

In summary, by virtue of the first connecting surface 21 which has various average slopes at different parts, the elastic cloth of the embodiment has a various thickness, such that the elastic cloth of the embodiment has relatively thick parts, which have relatively high density and hardness to enhance tightness, and relatively thin parts with low density and good softness to reduce a foreign body feeling. Therefore, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An elastic cloth comprising an array of unit sheet bodies which are connected to one another and which are aligned in a first direction and a second direction that intersects the first direction, each of said unit sheet bodies including:

a main sheet body part having a first sheet surface and a first boundary which loops around said first sheet surface, said first boundary including a first lateral side, and a second lateral side, said first lateral side having two opposite ends respectively connected to two opposite ends of said second lateral side at two junctions to form a loop that loops around the first sheet surface; and a connecting part connected to said main sheet body part and having a first connecting surface which adjoins said first boundary and faces in the same direction as said first sheet surface;

said first lateral side including two first lateral side segments which are respectively parallel to the second direction and the first directions, and a first corner segment which is connected between said first lateral side segments;

said first corner segment forming a center of said first lateral side, said center of said first lateral side being disposed between said two opposite ends of said first lateral side which connect said second lateral side at said two junctions;

said second lateral side including two second lateral side segments which are respectively parallel to the first direction and the second direction, and a second corner segment which is connected between said second lateral side segments;

said second corner segment forming a center of said second lateral side, said center of said second lateral side being disposed between said two opposite ends of said second lateral side which connect said first lateral side at said two junctions (ja);

said connecting parts of adjacent ones of said unit sheet bodies adjoining each other, said first connecting surface of said connecting part of each of said unit sheet bodies being sloped to indent from said first sheet surface such that a first groove is formed around said main sheet body part of each of said unit sheet bodies;

for each of said unit sheet bodies, an average slope of said first connecting surface adjacent to said center of said first lateral side being greater than an average slope of said first connecting surface adjacent to said center of said second lateral side.

2. The elastic cloth as claimed in claim 1, an average slope of said first connecting surface adjacent to each of said junctions is less than an average slope of said first connecting surface which is adjacent to said center of said second lateral side.

3. The elastic cloth as claimed in claim 1, wherein:

said main sheet body part further has a second sheet surface which is opposite to said first second surface, and a second boundary which loops around said second sheet surface, said second boundary including a third lateral side, and a forth lateral side which is connected to said third lateral side to form a loop that loops around said second sheet surface; and said connecting part further has a second connecting surface which adjoins said second boundary, faces in the same direction as said second sheet surface, and is sloped to indent from said second sheet surface such that a second groove is formed around said main sheet body part of each of said unit sheet bodies, for each of said unit sheet bodies, an average slope of said second connecting surface adjacent to a center of said third lateral side being greater than an average slope of said second connecting surface adjacent to a center of said fourth lateral side.

4. The elastic cloth as claimed in claim 3, wherein:

said third lateral side includes two third lateral side segments which are respectively parallel to the second direction and the first direction, and a third corner segment which is connected between said third lateral side segments;

said fourth lateral side includes two fourth lateral side segments which are respectively parallel to the first direction and the second direction, and a fourth corner segment which is connected between said fourth lateral side segments;

said second connecting surface of said connecting part of each of said unit sheet bodies includes a third groove side surface part which adjoin said third corner segment, and a fourth groove side surface part which adjoins said fourth corner segment;

said elastic cloth further comprises a ventilation slit which is formed between said third groove side surface part of said second connecting surface of each of said unit sheet bodies and said forth groove side surface part of said second connecting surface of an adjacent one of said unit sheet bodies; and said third groove side surface part has an average slope greater than an average slope of said fourth groove side surface part.

5. The elastic cloth as claimed in claim 1, wherein:

said main sheet body part further includes a second sheet surface which is opposite to said first sheet surface, and a second boundary which surrounds said second sheet surface; and said connecting part further has a second connecting surface which adjoins said second boundary, said second connecting surface of said connecting part of each of said unit sheet bodies being connected to said second connecting surface of said connecting part of an adjacent one of said unit sheet bodies and being sloped to indent from said second sheet surface such that a second groove is formed between said second connecting surfaces of said connecting parts of two adjacent ones of said unit sheet bodies, said second groove having a depth greater than a depth of said first groove.

6. The elastic cloth as claimed in claim 1, further comprising a ventilation slit formed between said connecting parts of adjacent ones of said unit sheet bodies, said ventilation slit being capable of being broaden to be formed into an enlarged ventilation hole when the elastic cloth is stretched.

7. The elastic cloth as claimed in claim 1, wherein:

said first connecting surface of said connecting part of each of said unit sheet bodies includes a first groove side surface part which adjoins said first corner segment, and a second groove side surface part which adjoins said second corner segment;

said elastic cloth further comprises a ventilation slit which is formed between said first groove side surface part of said first connecting surface of each of said unit sheet bodies and said second groove side surface part of said first connecting surface of an adjacent one of said unit sheet bodies; and said first groove side surface part has an average slope greater than an average slope of said second groove side surface part.

8. The elastic cloth as claimed in claim 5, wherein, for each of said unit sheet bodies, said first groove has a depth ranging from 0.1 mm to 1 mm, and said second groove has a depth ranging from 1 mm to 3 mm.

9. The elastic cloth as claimed in claim 1, wherein, for each of said unit sheet bodies, said main sheet body part has a thickness ranging from 1.5 mm to 5 mm, and said connecting part has a thickness ranging from 0.05 mm to 0.2 mm.

10. A protector which is adapted for fitting on a human skin, said protector comprising the elastic cloth as claimed in claim 1, and a fabric material disposed on said first sheet surface of said main sheet body part of each of said unit sheet bodies, said main sheet body part of each of said unit sheet bodies further having a second sheet surface which is opposite to said first sheet surface and which is adapted for contacting the human skin.

\*　　\*　　\*　　\*　　\*